(No Model.)
P. VAN GELDER.
SEPARATING MACHINE.
No. 314,497. Patented Mar. 24, 1885.
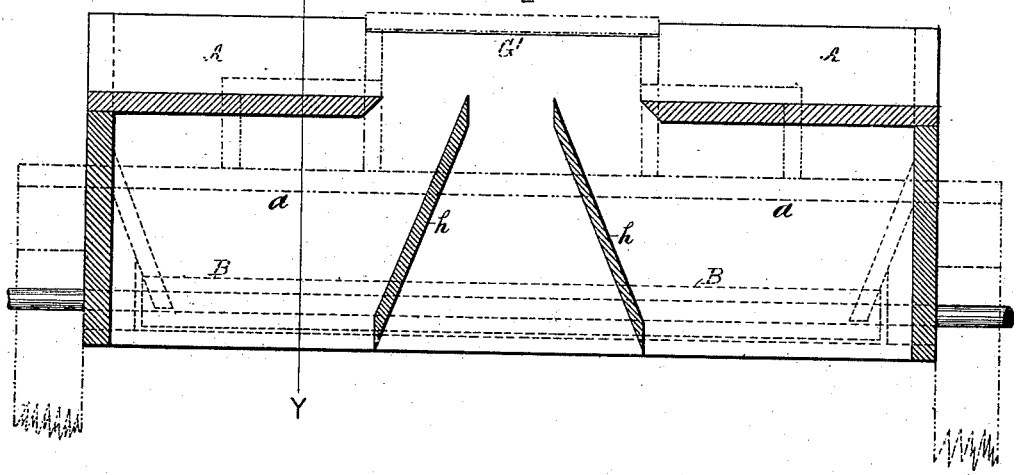
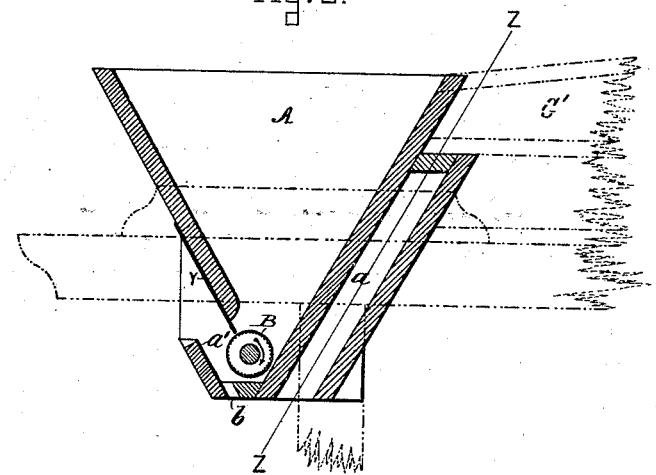
Witnesses.
Jas. F. Du Hamel
Walter S. Dodge
Inventor:
Pieter Van Gelder,
by Dodge & Son,
Attys.

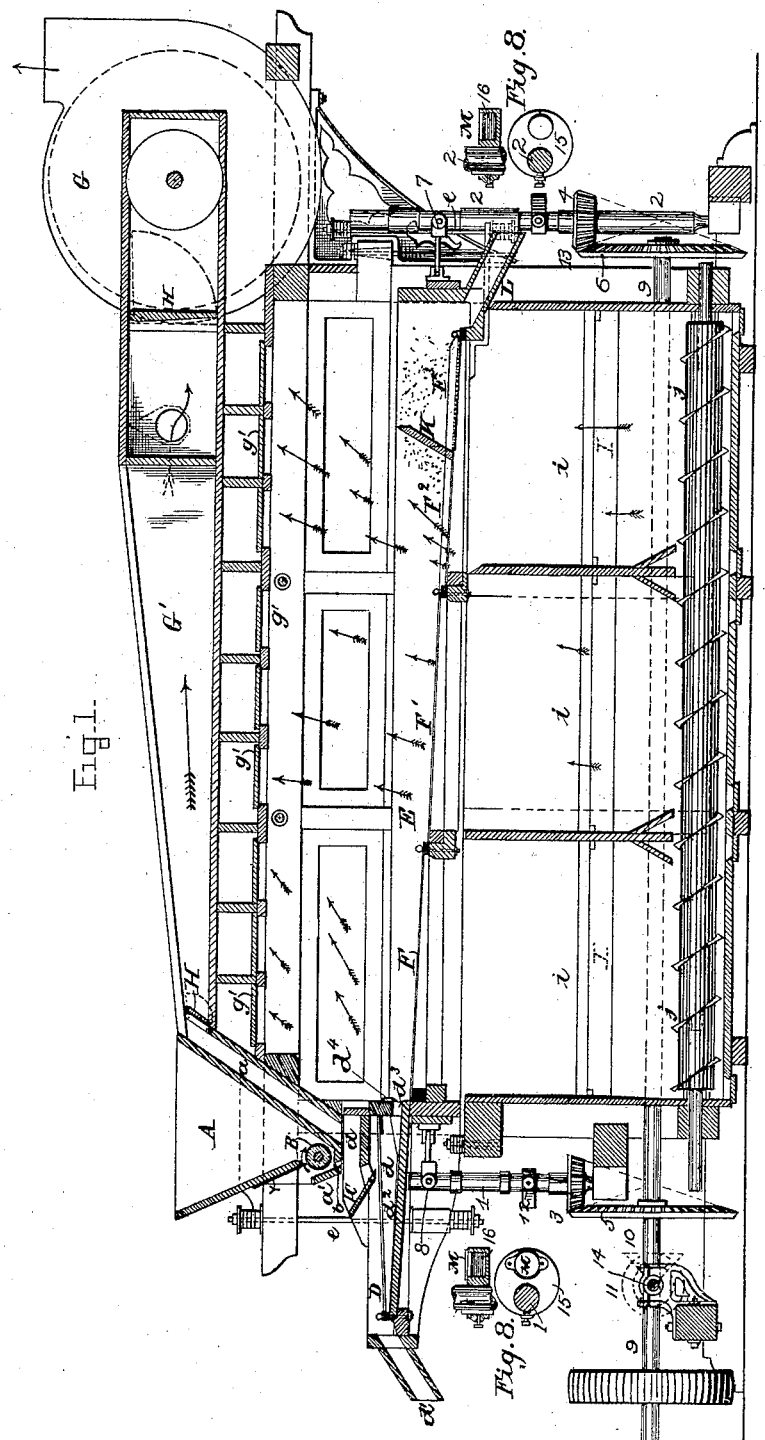

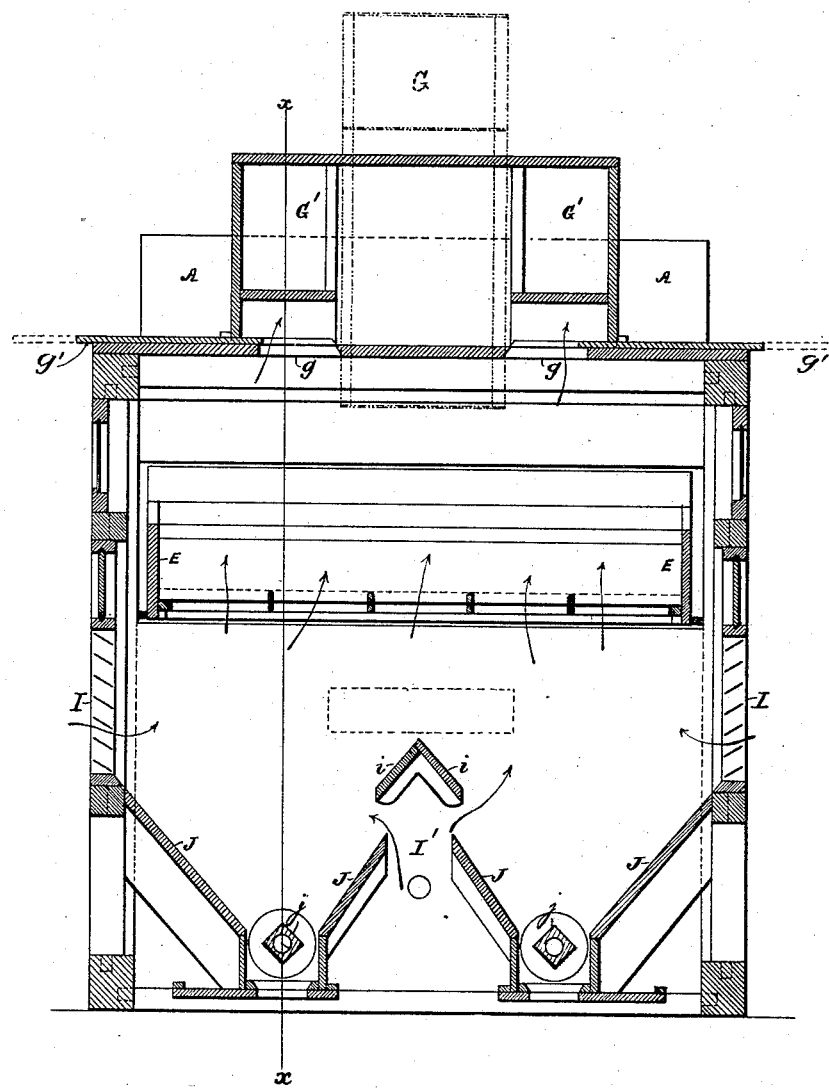

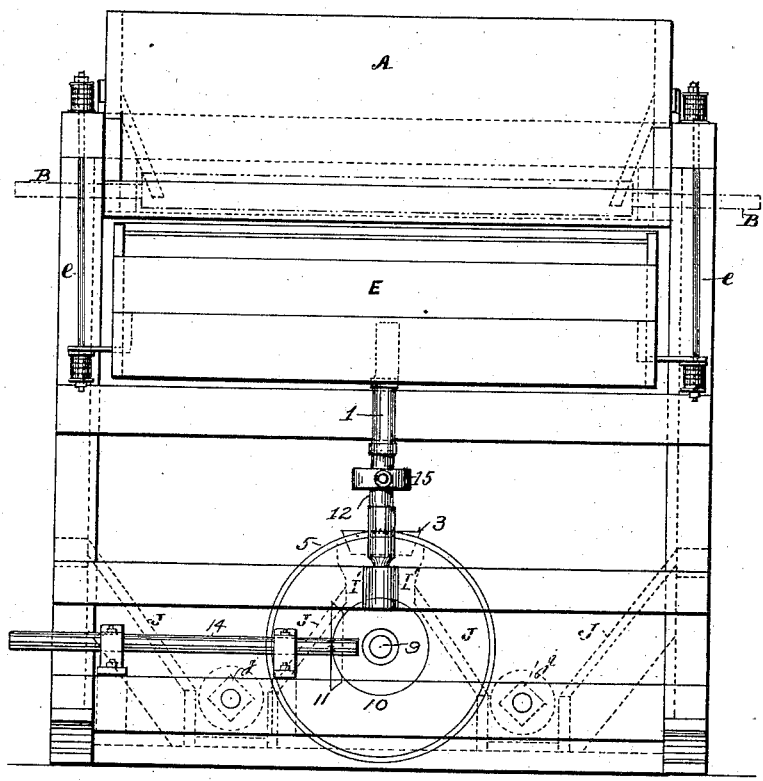

(No Model.)
P. VAN GELDER.
SEPARATING MACHINE.
No. 314,497.  Patented Mar. 24, 1885.
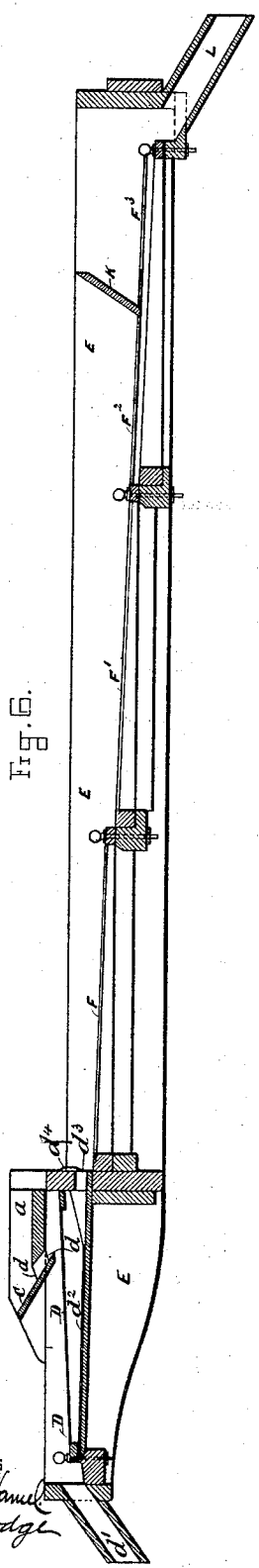
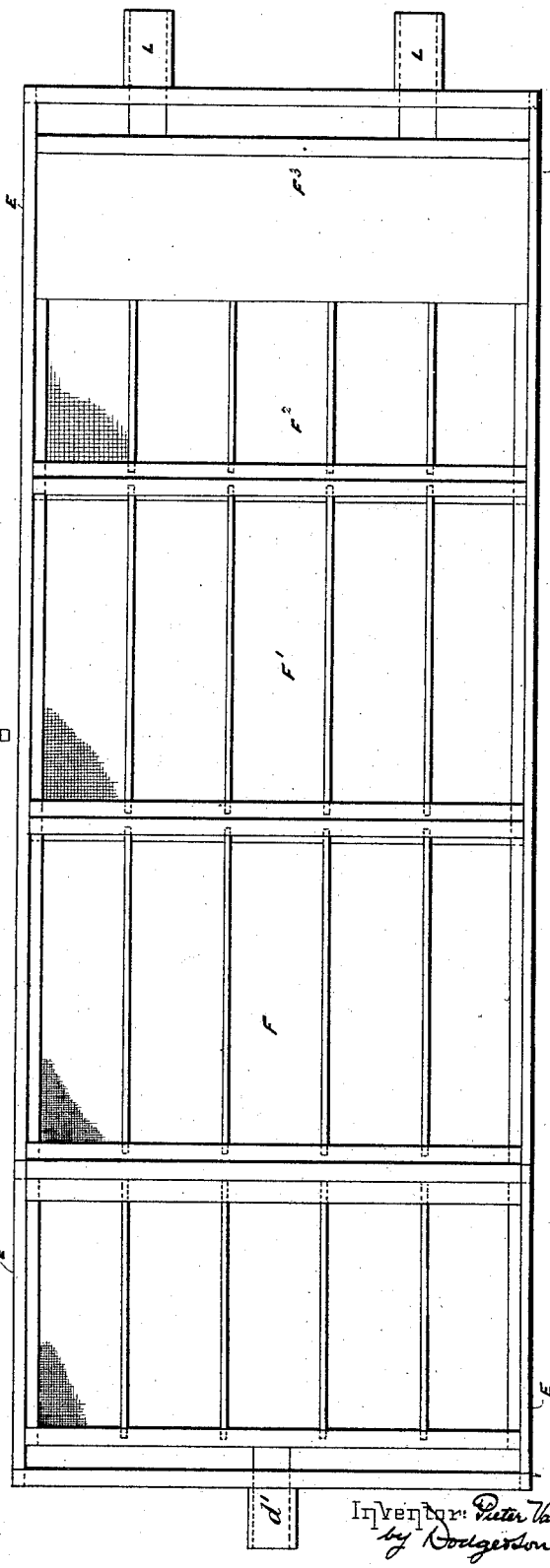

UNITED STATES PATENT OFFICE.

PIETER VAN GELDER, OF SOWERBY BRIDGE, COUNTY OF YORK, ENGLAND.

SEPARATING-MACHINE.

SPECIFICATION forming part of Letters Patent No. 314,497, dated March 24, 1885.

Application filed September 6, 1883. (No model.) Patented in England February 28, 1883, No. 1,083; in France August 28, 1883, No. 157,277; in Belgium August 29, 1883, No. 62,443, and in Italy September 3, 1883, No. 15,841.

*To all whom it may concern:*

Be it known that I, PIETER VAN GELDER, of Sowerby Bridge, in the county of York, in the Kingdom of England, have invented certain new and useful Improvements in Separating-Machines, (for which I have received Letters Patent in England, dated February 28, 1883, No. 1,083,) of which the following is a clear and correct specification.

My invention relates to that class of grain separating and cleaning machines in which are employed reciprocating sieves or screens acting in conjunction with an air-current; and it consists in various features, hereinafter fully set forth and claimed.

In the drawings, Figure 1 is a longitudinal section of my machine, taken on the line $x\ x$ of Fig. 2; Fig. 2, a transverse vertical section; Fig. 3, an end elevation; Fig. 4, a longitudinal section taken on the line $z\ z$, Fig. 5; Fig. 5, a transverse section of the hopper on the line $y\ y$, Fig. 4; Fig. 6, a longitudinal section of one of the screens or sieves; Fig. 7, a top plan view of the same, and Fig. 8 views illustrating details of the eccentrics for reciprocating the sieves or screens.

The machine about to be described embodies to some extent features set forth in my former patent, granted July 24, 1883, and numbered 281,808—that is to say, a sieve is operated by eccentrics or cranks at its opposite ends carried by two shafts geared to rotate synchronously; but in the present instance, as I employ only one screen-frame, I provide a dummy frame or bar as a counter-balance, or, as is preferred, I provide each shaft with a counterbalancing-eccentric.

The improvements relate more particularly to the peculiar construction of the feed-hopper, the arrangement of the air-ducts above the sieves or screens, to the construction of the screens or sieves themselves, and to the counterbalancing of the sieve or screen frame.

A is the hopper, into which the material to be operated upon is fed, said hopper being provided with a feed-roll, B, located within a trough, and an adjustable gate or slide, Y, as is usual. A board, $a'$, forms the front side of this trough, and at its base is the feed-opening $b$, extending throughout the length thereof, and through which the material is fed in an even stream onto the sieves or screens or onto the supplemental sieve D, as shown in Figs. 1 and 6; but before reaching either of the sieves the grain falls upon an inclined board or shelf, C.

G is a suction-fan placed at the upper rear side of the machine, and communicating by a trunk, G', with the casing of the machine and the chamber $a$, formed at the rear side of the hopper by a board parallel therewith, as shown in Figs. 1, 4, and 5. The trunk G' extends centrally along the top of the machine to the rear end, where it branches out at either side of the fan to allow the air to enter the eye of the latter, as shown in Figs. 1 and 2. Chamber $a$ at the rear side of the hopper is divided equally at its top opening and at its bottom opening by inclined boards $h$, (shown in Fig. 4,) so as to cause an equal current of air to flow through each of the three divisions forming the chamber $a$. The ends of the boards $h$ are beveled, in order to afford as little resistance to the air as possible, and it is apparent that more than three—say five or seven—may be used, although I prefer the arrangement shown and described. The fan G is rotated from any suitable source, and the air passing up through the chamber $a$ will act upon the grain while falling through opening $b$ onto shelf C', and from there to sieve D, and thus all light impurities are removed before the material passes onto the sieves, thereby greatly facilitating the action of the latter.

D is a sieve sloping slightly toward the front end of the machine and fixed to the main sieve-frame E, shaking with it and allowing the smaller particles of material fed onto it from hopper A to pass through, but delivering all pods, straw, and large articles at once out of the machine, through spout $d'$, in a direction contrary to that in which the good material travels. After passing through screens or sieves D the material falls upon the bottom board, $d^2$, and is fed thereby through opening $d^3$ onto the sieve or screen F, carried by sieve-frame E, said opening $d^3$ being provided with a regulating gate or bar, $d^4$, as shown in Figs. 1 and 6. The sieve-frame is suspended by rods $e$ from the framing of the machine, and it is caused to reciprocate by means of eccentrics 7 and 8, placed, respectively, on the vertical shafts 2 and 1, as in the patent above referred to, and as shown in Figs. 1, 3, and 8. Motion is imparted to shaft 9, extending lengthwise of the machine, by means of bevel-gears 10 11, the former rigidly secured to shaft 9 and the latter to shaft 14, extending at right angles to shaft 9, as shown in Figs. 1 and 3. This gearing may be dispensed with and motion imparted to shaft 9 direct.

In order that the two vertical shafts 1 2 may rotate in unison, they are provided with bevel-gears 3 4, which mesh with and receive motion from similar gears, 5 6, rigidly secured upon shaft 9, as shown in dotted lines in Fig. 1. Sieve-frame E is provided with sieves or screening material F, F', and F², of a gradually-decreasing fineness, and immediately above and corresponding therewith are the air-passages $g$, communicating with the main duct G', and provided with slides $g'$, by which they may be regulated and increased as to the size of their openings just in proportion as the meshes of the sieves or screening material become larger.

Air is admitted to the machine at the sides thereof through openings provided with louver-boards I, Fig. 2, and by an opening, I', extending longitudinally in the machine beneath the middle of the screen or sieve, the air entering through the latter opening being deflected by baffle-plates $i$, and prevented from passing up by the sides of the sieves by cloth curtains, as usual, or in any suitable manner. The air is thus caused to pass through the screens in an upward direction, and acts upon the material thereon, which in the meantime is being thoroughly shaken by the reciprocation of the sieves.

The sieves are inserted in frames, so as to be readily removable, and are secured in place by bolts or screws, as shown in Figs. 1 and 6, each succeeding screen being slightly lower than the preceding one, in order to form a step down which the material falls. This is an important feature of my machine, as it causes the material to turn over after leaving each sieve, and thus is subjected to the air-currents on all sides. About the middle of the last sieve or screen, F², and extending transversely across the same, is an inclined bridge, K, (shown in Figs. 1, 6, and 7,) while beyond this bridge K is an imperforate plate, F³, in the same plane as the screen or sieve F². The slides $g'$ in the air passages or openings $g$ are regulated so as to make the opening above the plate K larger than the openings over the sieves F, F', and F², while the valves $g'$ beyond the bridge K are opened still more and make the opening over the plate F³ larger than any of the others. The force of the blast or suction above and beyond the bridge K causes the light material to fly upward over the bridge; but as the air-current over the bridge increases, and further increments are prevented by the imperforate plate F³, the force of the current is weakened, and the material lifted up falls down into the quiet space beyond the bridge onto plate F³, and is finally discharged out through spouts L, Figs. 1, 6, and 7. The grain, however, being heavier, does not rise above the bridge, but passes through the meshes of the sieve or screen F², which meshes are made rather larger at this point, so as to facilitate their passage.

For the purpose of counterbalancing the sieve or screen frame E, I employ a counter-weight (one or more) made in the form of an eccentric, and applied to the vertical shaft or shafts 1 2 in position diametrically opposite to that of the eccentrics 7 8, by which motion is imparted to the frame E. These eccentric counter-weights 15 render unnecessary the lower dummy-sieve, W, or its substitute, a connecting-bar hitherto employed for counterweighting the screen, and the present plan is peculiarly important and advantageous in grain and flour cleaning machines, for the reason that it renders unnecessary any moving part for this purpose beneath the screen, where it would be liable to interfere with the air-currents or with the fall of material.

It is difficult to make the sieves and frame E always of like weight, and this difficulty is increased by the use of interchangeable screens. To meet this I form each counter-weight with a well or recess, M, into which I drop any number of metal disks or weights, 16, required to counterbalance the screen-frame and its containing screens.

Valves or gates H are applied to the air-duct G' to regulate and control the air-current therein.

The material after passing through the sieves or screens falls onto the inclined boards J and $i$, and is conveyed from the machine through separate valved outlets by the conveyers, as shown in Figs. 1, 2, and 3, vertical dividing-boards being provided to keep separate and distinct the different grades of material.

The machine can be used for cleaning and separating various materials besides grain, as the sieves or screens can be replaced by those of any desired mesh or character.

The dusty air-current may be carried off from the machine to a dust-collector or discharged into the open air.

When the machine is to be used for grain or as a middlings-purifier, the feed-roller B will be caused to revolve in the reverse direction—that is to say, away from the rear side of the hopper—and in which case the feed-regulating gate Y will be used.

I am aware that counter-weights have been applied to crank-shafts carrying a screen, and I have myself obtained a patent for two crank-shafts carrying a screen and geared together, and hence I do not claim these features separately.

Having thus described my invention, what I claim is—

1. In a separating-machine for peas, the hopper A and feed-roller B, revolving with its upper surface traveling toward the neighboring back of the hopper, and bringing the feed down between the back of the hopper and feed-roll, and then between the bottom of the hopper and the feed-roll, the bottom and side of the hopper thus forming, roughly, a concave surface, between which and the roller the feed is drawn, said hopper-bottom being constructed with the feed-hole $b$ and lip $a'$, rising beyond the feed-hole nearly to the top of the feed-roll, substantially as and for the purpose described.

2. In a separating-machine, the combination of a main frame or casing, a reciprocating sieve-frame mounted in said main frame, and provided with a series of sieves of gradually-increasing coarseness, a bridge extending transversely across the sieve-frame near its lower end, an imperforate plate in the same plane with the sieves, beyond the bridge, an air-trunk above the sieves, having openings of increasing size to correspond with the increase in size of the meshes of the sieves, and a fan for producing a current of air through said trunk, all constructed and arranged to operate substantially as set forth.

3. In combination with sieve $F^2$, having imperforate plate $F^3$ and bridge K, an air-trunk above the sieve, and provided with an air-inlet beyond the end thereof, and a fan adapted to cause a current of air to pass upward through the sieve to said outlet.

4. In a separating-machine, the combination of two vertical shafts geared to rotate synchronously, a sieve or screen carried at its ends by eccentrics placed at equal angular distances upon said shafts, and a pair of counterweighted eccentrics placed on the same shafts at an angle of one hundred and eighty degrees with the sieve-eccentrics, whereby the sieve may be counterbalanced throughout its entire movement.

5. In combination with vertical shafts 1 2, provided with eccentrics 7 8, carrying a screen-frame, E, horizontal shaft 9, geared with shafts 1 2, to impart equal and synchronous motion thereto, and eccentrics 15, provided with wells or recesses M, to receive weights 16, and secured upon the vertical shafts in position diametrically opposite the eccentrics 7 8, by which the screen-frame E is carried.

6. In a separator, the combination of a shaft, a counter-weight placed eccentrically to the shaft, and provided with weight-hole M and weights, as and for the purpose described.

In testimony whereof I have signed my name to this specification in the presence of two subscribing witnesses.

PIETER VAN GELDER.

Witnesses:
 W. P. THOMPSON,
 I. OWDEN O'BRIEN.